Figure 1:
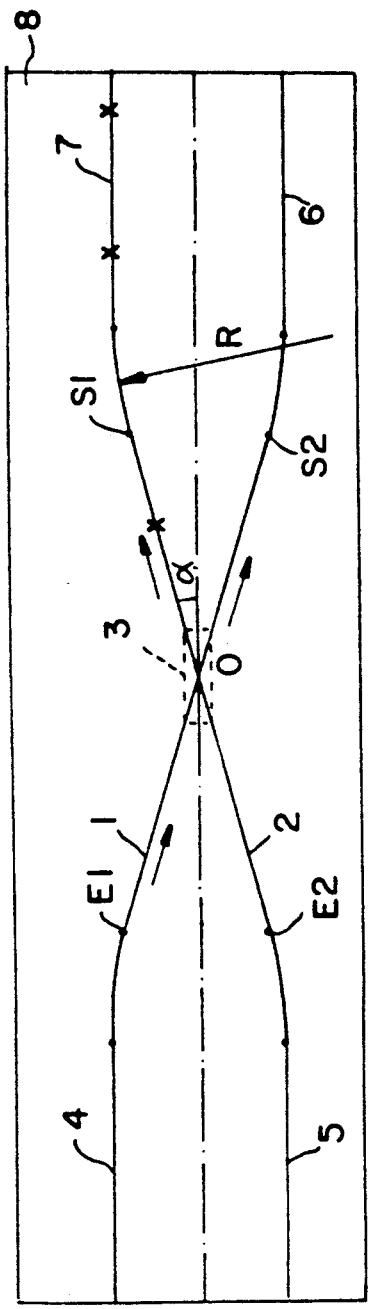

United States Patent [19]

Lerminiaux

[11] Patent Number: 5,297,233
[45] Date of Patent: Mar. 22, 1994

[54] INTEGRATED OPTICS ACHROMATIC SPLITTER AND AN MXN COUPLER INCORPORATING SUCH A SPLITTER

[75] Inventor: Christian Lerminiaux, Fontainebleau, France

[73] Assignee: Corning Incorporated, Corning, N.Y.

[21] Appl. No.: 922,538

[22] Filed: Jul. 30, 1992

[30] Foreign Application Priority Data

Aug. 13, 1991 [FR] France ............................... 91 10271

[51] Int. Cl.$^5$ .............................................. G02B 6/26
[52] U.S. Cl. ...................................... 385/27; 385/48
[58] Field of Search ..................... 385/15, 17, 20, 21, 385/27, 39, 42, 48

[56] References Cited

U.S. PATENT DOCUMENTS

| | | | |
|---|---|---|---|
| 4,693,546 | 9/1987 | Lorenzo et al. | 385/48 |
| 4,730,884 | 3/1988 | Seino et al. | 350/96.14 |
| 4,874,216 | 10/1989 | Utaka et al. | 350/96.19 |
| 4,961,619 | 10/1990 | Hernandez-Gil et al. | 350/96.12 |
| 5,133,029 | 7/1992 | Baran et al. | 385/27 X |

FOREIGN PATENT DOCUMENTS

| | | |
|---|---|---|
| 0385671 | 9/1990 | European Pat. Off. . |
| 332508 | 1/1985 | Fed. Rep. of Germany . |
| 58-82209 | 5/1983 | Japan . |
| 61-194408 | 8/1986 | Japan . |

OTHER PUBLICATIONS

Gevorgyan et al., "Power Distribution in Symmetric Integrated Optic X Junction", Electronics Letters, vol. 26, No. 12, Jun. 7, 1990, pp. 788-789.
"Low-Loss Ti:LiNbO$_3$ Intersecting Waveguides" by Agrawal et al., Applied Phys. Lett., vol. 54, No. 17, Apr. 24, 1989, pp. 1669-1671.
"The Optical Power Distribution and Scattering Losses in Symmetric Channel Waveguide X-Junctions" by Gevorgyan et al., Optical and Quantum Electronics, vol. 23, No. 5, May 1991, pp. 649-656.
"Wavelength and Polarization Insensitive 3dB Cross-Coupler Power Dividers by Ion Exchange in Glass" by Hussell et al., Applied Phys. Lett., vol. 56, No. 24, Jun. 11, 1990, pp. 2381-2383.
"Low-Loss Directional Couplers Utilizing Single-Mode Fiber-Optic Waveguides" by Belovolov et al., Sov. Journ. Quantum Electron., vol. 15, No. 9, Sep. 1985, pp. 1238-1242.
"3×3 Single-Mode Star Coupler Made from 2×2 Couplers" by Marhic et al., Applied Optics, vol. 29, No. 12, Apr. 20, 1990, pp. 1810-1813.
"Ti:LinbO$_3$ Intersecting Waveguides" by G. A. Bogert, Electronics Letters, Jan. 16, 1987, vol. 23, No. 2.
"A Beam Propagation Method Analysis of Active and Passive Waveguide Crossings" by Neyer et al., Journal of Lightwave Tech., vol. LT-3, No. 3, Jun. 1985.
"Crosstalk Characteristics of Ti-LiNbO$_3$ Intersecting Waveguides and Their Application as TE/TM Mode Splitters" by Nakajima et al., IEEE Journ. of Quantum Elects., vol. QE-18, No. 4, Apr. 1982, pp. 771-775.
"Low Crosstalk Passive Polarization Splitters Using Ti:LiNbO$_3$ Waveguide Crossings" by A. Neyer, published in the USA Journal Applied Physics Letters of Sep. 4, 1989, pp. 927-929.
"Single-Mode Cross-Coupler 3dB Power Dividers by Ion Exchange" by Hussell et al., Technical Digest, Second Microptic Conference/Eighth Gradient Index (MOC/GRIN), Tokyo Jul. 1989, Paper D3, pp. 70-73.
"An Analysis of Intersecting Diffused Channel Waveguides" by Feit & Fleck, IEEE Journ. of Quantum Elects., vol. QE-21, No. 11, Nov. 1985, pp. 1799-1805.
"Experimental Demonstration of Optical Field Evolution in Waveguide Junctions by Using a Video Camera Observing System" by Okamura et al., Applied Optics, vol. 29, No. 34, Dec. 1990, pp. 5086-5089.

Primary Examiner—Rodney B. Bovernick
Assistant Examiner—John Ngo
Attorney, Agent, or Firm—K. McNeill Taylor, Jr.

[57] ABSTRACT

A splitter is produced by ion diffusion in a glass substrate and it is designed to assure the transmission of an optical signal toward two outputs with a predetermined ratio of the signal power appearing at these 2 outputs. In accordance with the invention, it comprises an X-junction of two rectilinear waveguides defining at their intersection a half-angle α, the angle and the geometry of the central region being chosen in such a way as to establish the predetermined power ratio and the relative achromaticity of the device.

11 Claims, 5 Drawing Sheets

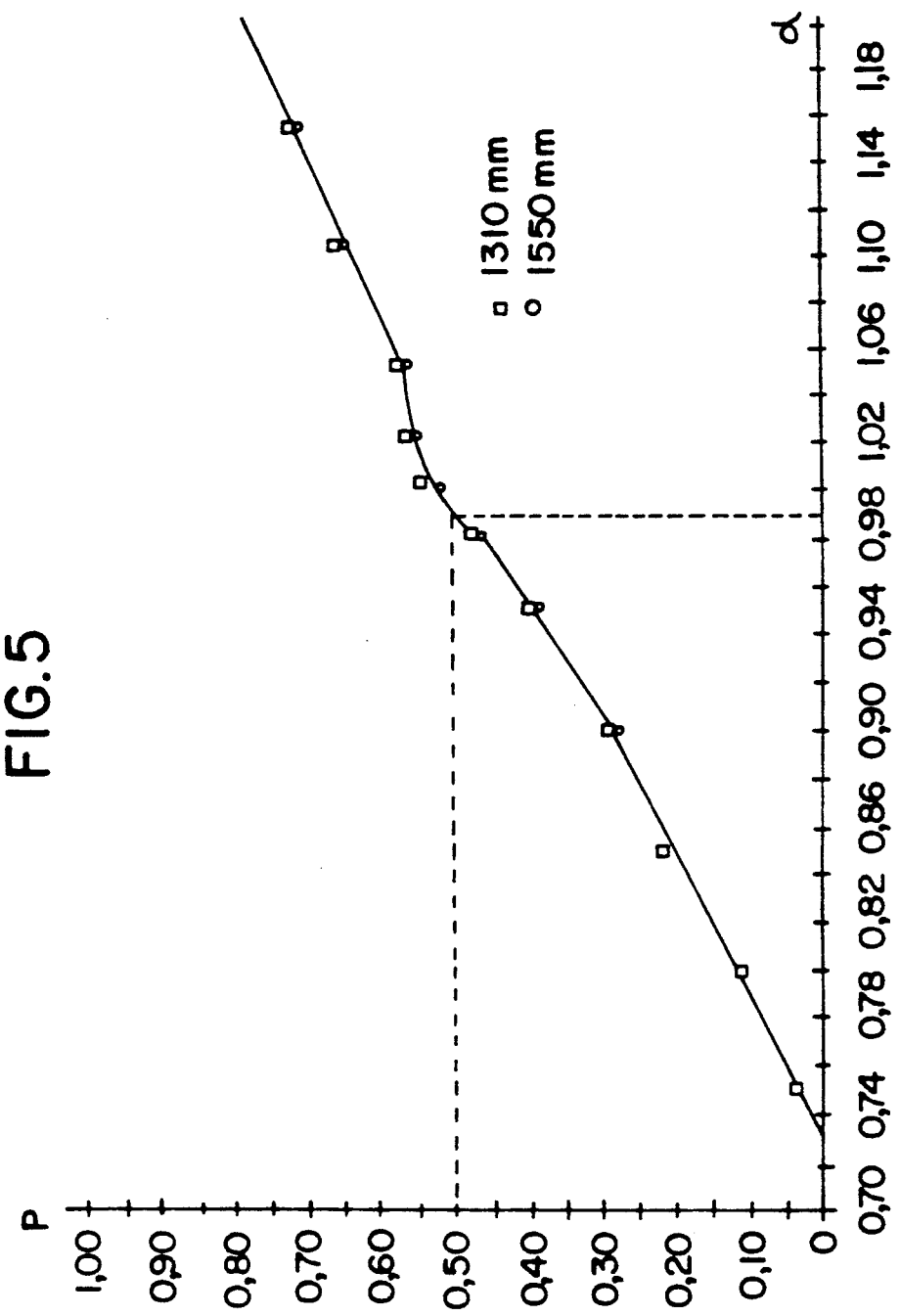

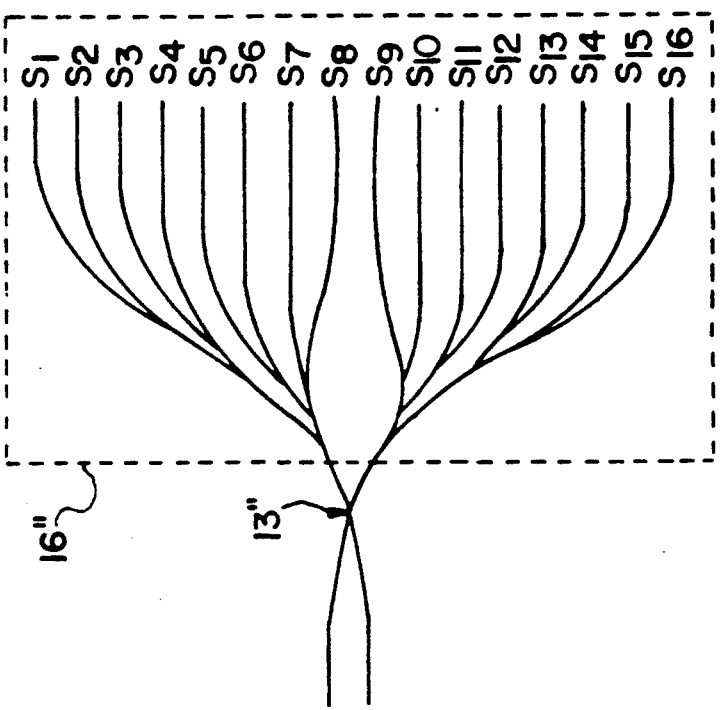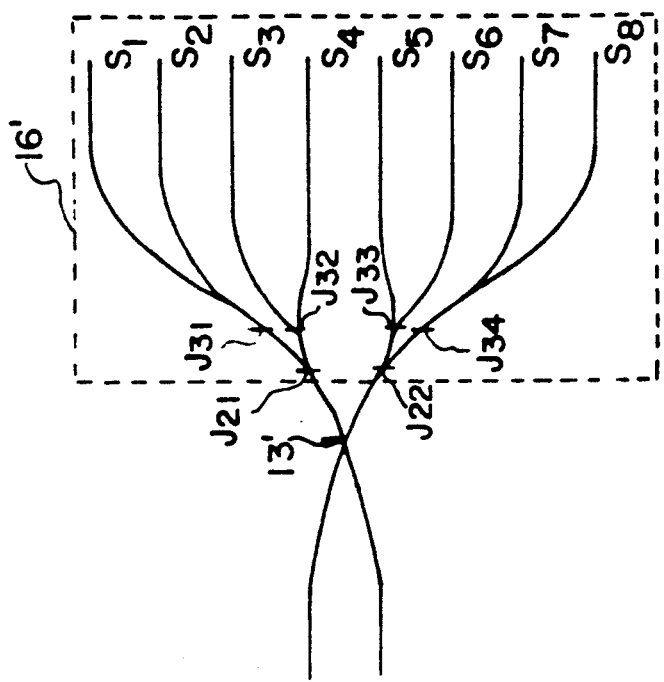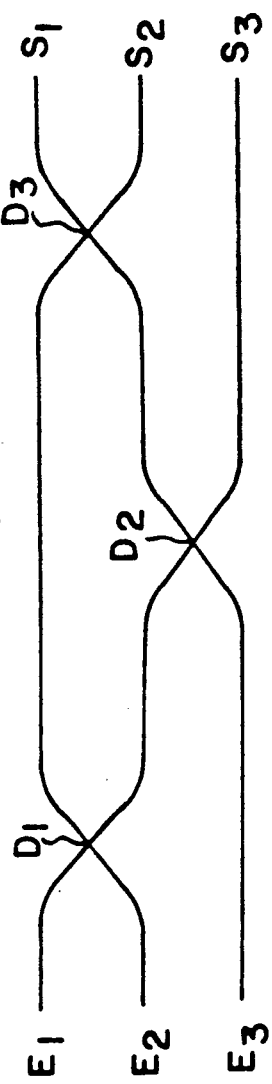

INTEGRATED OPTICS ACHROMATIC SPLITTER AND AN MXN COUPLER INCORPORATING SUCH A SPLITTER

BACKGROUND OF THE INVENTION

The present invention relates to an integrated optics achromatic splitter with two inputs, and with M×N couplers incorporating such splitters. More particularly, the present invention relates to such a splitter which has been designed to assure a division of the light power in accordance with a predetermined power ratio. More particularly still, the present invention relates to such a splitter which is capable of being used in single mode fiber optic telecommunications networks.

It is known to divide light power which is transmitted by a waveguide, through the technology of integrated optics proximity couplers formed by two waveguides integrated in a single substrate, these two waveguides including two sections of identical and generally parallel guides, through which a fraction of the light power transmitted by one of the guides is injected into the other guide.

Such a proximity coupler is not, however, achromatic; that is to say the ratio of the output powers of the guides varies with the wavelength of the utilized light.

This chromaticity of proximity couplers renders the latter scarcely useable in optical fiber telecommunications networks which contain such splitters. In practice, it is desirable that such splitters be associated with sources of light energy of diverse wavelengths, located for example in the 1260-1550 nm wavelength region, without the ratio of power division being affected.

To resolve this difficulty it is known to provide couplers called "$\Delta\beta$" with two parallel waveguides having different propagation constants. By correctly adjusting the difference, on can obtain a reduced chromatic dependence compared with that which is observed for proximity couplers. Unfortunately these $\Delta\beta$ couplers are difficult to manufacture and have characteristics which are not very reproducible, and which are latent drawbacks for applications requiring mass production such as telecommunications.

In order to obtain a satisfactory achromaticity it is known further to provide a coupler which is formed of two Y-junctions arranged end to end. Such a coupler unfortunately experiences substantial losses. The Y-junction at the input in practice experiences a loss of 3 dB at each output guide, due to the division into one-half generated by the Y-junction at the output.

One can avoid this loss by utilizing an "X"-splitter with two crossed rectilinear waveguides. Such a splitter is described in the article entitled "Low crosstalk passive polarization splitters using Ti:LiNbo3 Waveguide Crossings" by A. Neyer, published in the USA journal "Applied Physics Letters" of 4 Sep. 1989, pages 927-929. The substrate which is utilized is made of lithium niobate. The variation of refractive index is obtained by the diffusion of Ti+ ions. The splitter, as this publication indicates, is very sensitive to polarization. Further, it is not achromatic since the publication mentions a variation of ±0.3 dB of the output power within the limited band of the wavelengths situated between 1500 and 1600 nm. Therefore, these characteristics are latent defects for the telecommunications application envisaged above. In practice the fibers utilized do not maintain the polarization and this can be risky for the input of a component. Further, the components of the type "power splitter" must behave achromatically in the two utilization windows: 1310±50 nm and 1550±50 nm.

The publication of Nakajima et al. entitled "Crosstalk characteristics of Ti—LiNbO3" published in the American journal "Journal of Quantum Electronics", volume QE-18, No. 4, Apr. 1982, considers X-junctions and the division ratio of the light powers which are transmitted in the two output branches of the junction. There again the substrate utilized is a crystal of lithium niobate which implies a variation of the division ratio of the junction as a function of the polarization of the light utilized. The junction described is applied elsewhere only in the realization of a polarization separator and not a splitter or coupler such as is intended by the present invention. Further, this publication envisages only multimode guides which cannot be contemplated for components intended for long distance telecommunications.

The publication of Hussel et al. entitled "Single mode 3 dB cross-coupler power dividers by ion exchange" in the "Technical Digest", Second Microptic Conference/Eighth Gradient Index (MOC/GRIN), Tokyo 07/1989, Paper D3, pages 70-73, relates to an integrated optics half-divider obtained by ion exchange in a glass substrate. The input branches of the X-coupler which is proposed are of necessity asymmetrical, which renders them difficult to manufacture. In addition, the publication does not indicate anything with respect to splitter manufacture capable of establishing splitting ratios other than the ratio ½. The complexity of the central region of Hussel makes the photolithographic step very difficult.

Figure 2:
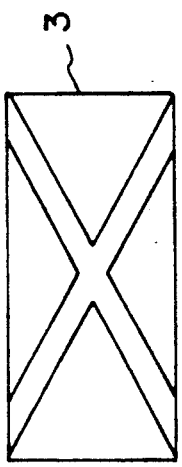
Figure 3:
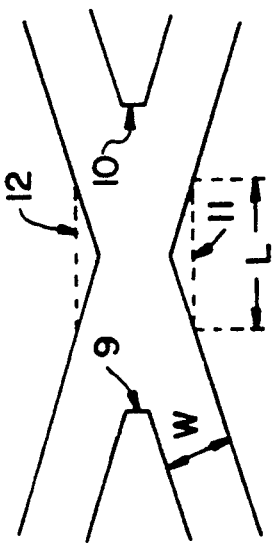

Hernandez-Gil et al. U.S. Pat. No. 4,961,619 is directed to an optical waveguide intersection with reduced loss utilizing an axial variation in the transverse index of refraction distribution as the waveguides approach the intersection. Hernandez-Gil et al. states: "intersection angles of less than 5 degrees are usually not practical" (col. 3, lines 20-21). As shown in FIGS. 2 and 3, the flat intersection is not formed by cutting off the vertex of the angle of intersection, but by "down-tapering" the waveguides as they approach the intersection region (see, e.g., col. 3, lines 44-52).

The present invention has thus as its goal the manufacture of an X-splitter in integrated optics, free of the defects or inadequacies of splitters of the prior art technology described above.

In particular, the present invention has as its goal the manufacture of such a splitter which permits the assurance of a predetermined ratio of power while being achromatic and insensitive to the polarization of the transmitted light.

The present invention also has as its goal the manufacture of such a splitter which should be easy to fabricate and thus not costly.

The present invention also has a goal of furnishing M×N couplers in integrated optics including such splitters.

These as well as other goals of the invention which will appear in the reading of the present description are achieved with an integrated optics achromatic splitter having two inputs for the transmission of an optical signal entering one input, to two outputs with a predetermined ratio of the signal powers at the two outputs, this splitter being remarkable in that it includes a symmetrical X-junction of two identical rectilinear waveguides, single mode at the utilized wavelength, defining at their intersection a half-angle greater than an angular value which is a function of the size of the fundamental mode of the waveguides (and therefore a function of the design and manufacture of the waveguides), the angle being selected to establish the predetermined power ratio. Another feature of the junction of the present invention which is particularly useful for the industrial realization of these devices is the fact that the index profile need not be carefully controlled in the central region. As described below, the maximum profile index is between $\Delta n$ and 1.5 $\Delta n$ where $\Delta n$ is the maximum profile index for any of the waveguides.

In accordance with the invention, in effect, one can establish experimentally a rule which links the angle of the waveguides for a given index profile and the power ratio obtained for each angle, and then this rule may be utilized for choosing the angle corresponding with a predetermined power ratio. It is also possible to vary the power ratio for a fixed angle by proper selection of the waveguide index profile (by changing the mask aperture, for example, when using the ion exchange technique), the only requirement being to maintain the single mode behavior of the waveguides in the wavelength range of interest.

Still following the invention, the waveguides of the splitter are formed for example by the ion exchange in a glass substrate in such a way as to provide substantially cylindrical shapes. One obtains thus the desired insensitivity to polarization of light. Other substrates and other manufacturing processes are possible. Thus, the waveguides could be produced by depositing doped silica on a substrate of silica or silicon, for example.

The invention further permits the production of $2 \times N$ couplers comprising a splitter in accordance with the invention and additional splitting means connected to the two outputs of the splitter. Advantageously the half-angle of the waveguides of the splitter is of the order of 1°, in order to split the power in half as will be seen below.

The invention permits further the production of $M \times N$ couplers comprising at least two successive stages of splitters in accordance with the invention.

Figure 4:
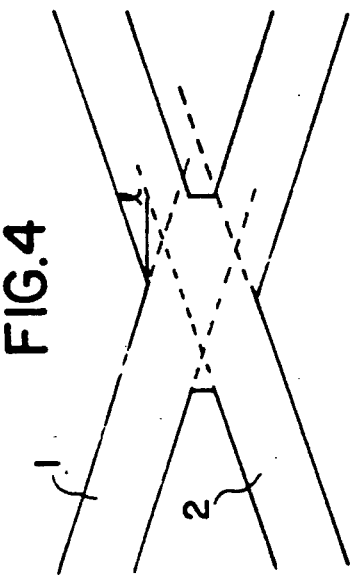
Figure 6:
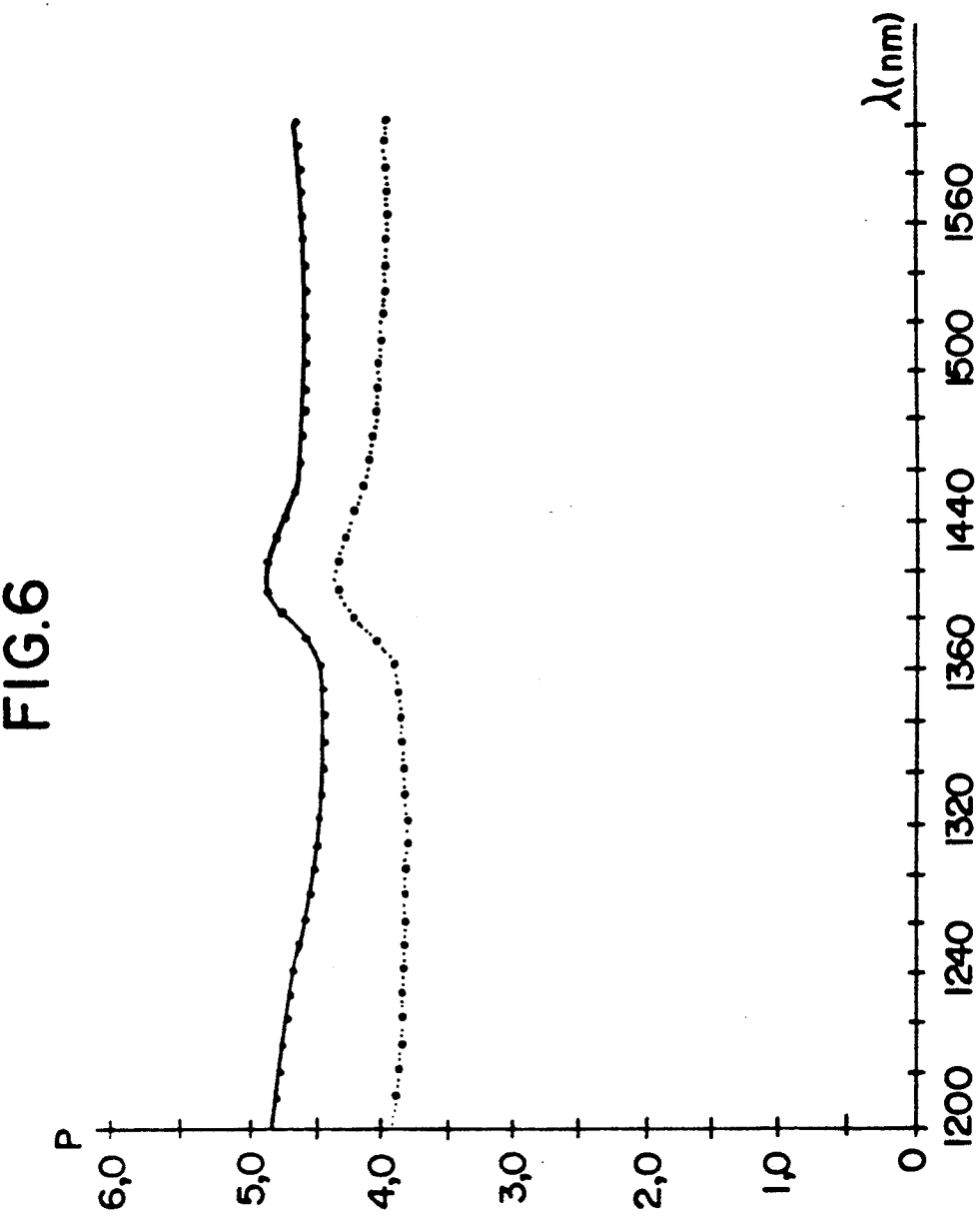
Figure 7:
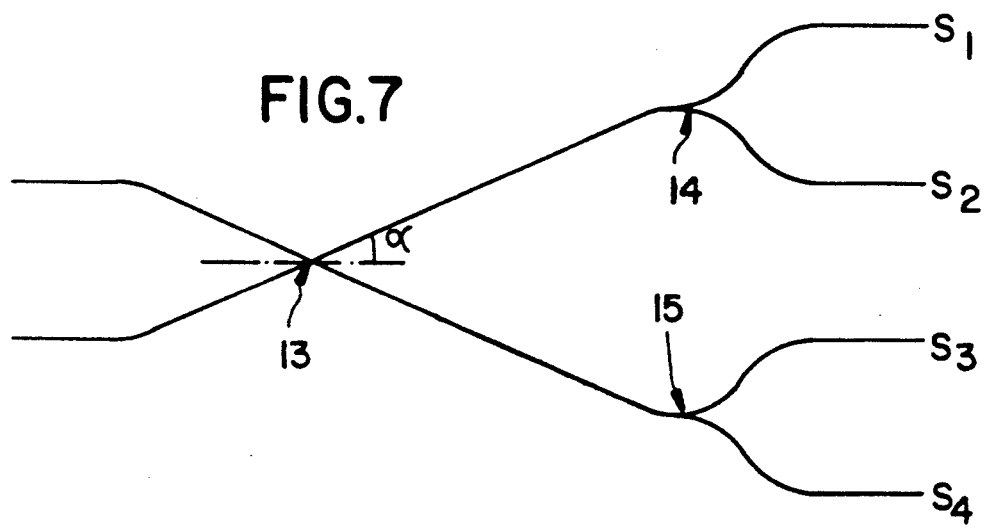
Figure 8:
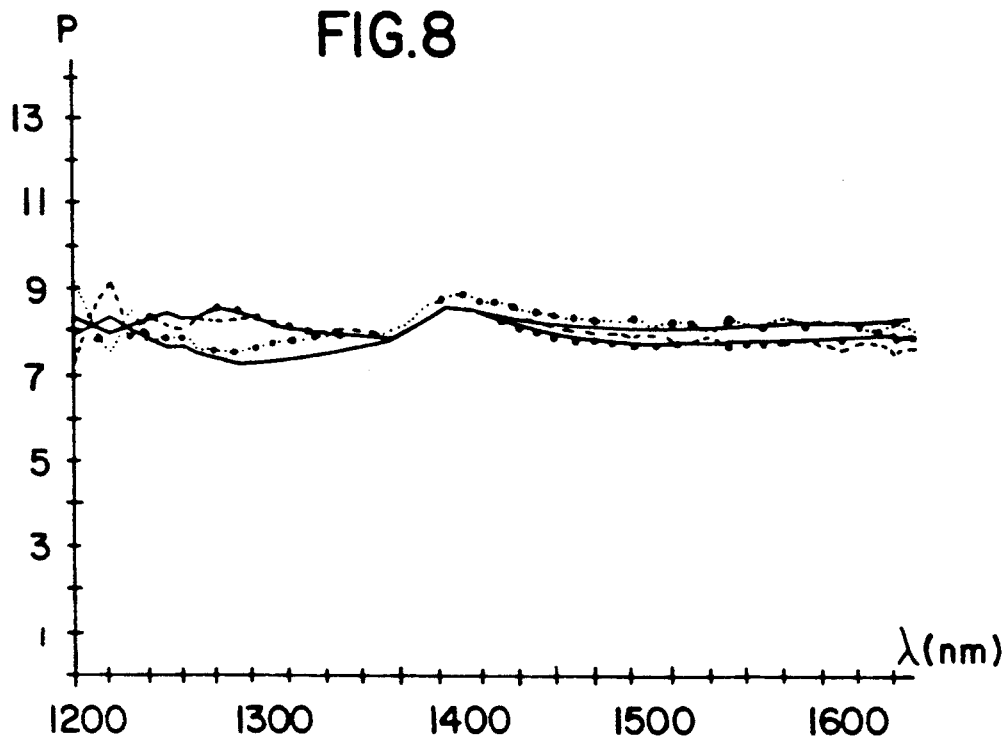

Other characteristics and advantages of the present invention will appear in the reading of the description which follows by the examination of the attached design in which:

FIG. 1 is a schematic representation of a splitter according to the invention, the scale of the representation transverse to the axis of the splitter being exaggerated in order to have the slope of the two waveguides of the splitter appear more clearly one above the other, FIG. 2 is a more detailed schematic representation of the intersection of the waveguides of the splitter of FIG. 1, FIG. 3 represents a variant of the intersection of the waveguides of the splitter of FIG. 1, FIG. 4 represents a second variant of the intersection of waveguides of the coupler in FIG. 1, FIG. 5 is a graph of the relationship which links the slope of the waveguides of the splitter of FIG. 1 and the ratio of the powers transmitted, by the two outputs of the splitter, FIG. 6 is a graph of the variation as a function of wavelength of the light powers transmitted at the outputs of the splitter when the half-angle $\alpha$ of the waveguides of the splitter at their intersection is chosen in such a way as to assure the power ratio 0.45/0.55, FIG. 7 is a schematic of the plot of the waveguides of a $2 \times 4$ splitter incorporating a splitter in accordance with the invention, FIG. 8 is a graph of the variation of light power appearing at the outputs of the coupler of FIG. 7 as a function of the wavelength of the utilized light, FIGS. 9 and 10 are schematic representations of plots of the waveguides of $2 \times 8$ and $2 \times 16$ couplers respectively, incorporating a splitter in accordance with the invention, and FIG. 11 represents schematically a plot of the waveguides of a $3 \times 3$ coupler.

We refer to FIG. 1 of the attached design where the splitter represented comprises two waveguides having rectilinear sections 1, 2 which intersect in area 3 represented in greater detail in FIG. 2, in accordance with half-angle $\alpha$ which is very exaggerated in the drawing, as explained in the above statement of the drawn figures. As represented, the inputs $E_1$, $E_2$ and the outputs $S_1$, $S_2$ of the splitter can be connected to other rectilinear sections 4,5,6,7 respectively, parallel to the bisector of angle by curved lines of radius R chosen to minimize the losses of light energy which are called curvature losses. Other geometries for these sections 4, 5, 6, 7 can be utilized, depending on the geometry chosen to pigtail the fibers to the device.

Such a splitter can be produced conventionally by diffusion of ions in a substrate of glass 8, through a mask. The utilization of a glass substrate in the splitter according to the invention is especially advantageous because this material is much less costly than the crystalline lithium niobate substrates utilized in certain production of the prior art technology which were described in the introduction of the present description. One can, in accordance with the invention, proceed by diffusion of thallium $Tl^+$ ions which permits the production of circular waveguides having a diffusion profile which is approximately circular, providing a 1/e radius (defined as the radius at which the index is 1/e times the maximum index) on the order of $4 \pm 0.5$ $\mu$m, for example. Continuing as an example, the maximum index introduced by the diffusion of the $Tl^+$ ion can be about $0.35\% \pm 0.05\%$.

We refer now to FIG. 5 of the attached drawing where is represented the rule of variation in the fraction of light power of an input signal transmitted at output $S_2$ of the splitter in accordance with the invention, starting with a signal which is injected at input $E_1$, for example, when the half-angle $\alpha$ of the rectilinear sections of the splitter is caused to vary from 0.7° to 1.2° approximately.

When the waveguides are such that the transverse light intensity (fundamental mode) is of dimensions close to that of the fundamental modes of the single mode optical fiber currently used in telecommunications (of cut-off wavelength about 1.2 $\mu$m), that is to say that this distribution is nearly a Gaussian distribution with $1/e^2$ radius equal to 4.5 $\mu$m for the wavelength of 1.3 $\mu$m and of 6 $\mu$m for the wavelength of 1.55 $\mu$m, it can be remarked that this rule is approximately linear starting from a half-angle of 0.72° (an angle for which the entire light power is deflected into the guide $S_1$). This angle depends, however, on the specific index profile dimension of the waveguides.

We observe that for small values of $\alpha$ on the order of 0.7–0.8°, a very large part of the light power received by input $E_1$ of the splitter is deflected toward output $S_1$ of this splitter. As $\alpha$ increases, the fraction of the power which is deflected toward $S_1$ diminishes according to the rule illustrated by the graph of FIG. 5, established experimentally. As soon as $\alpha$ reaches a few degrees, practically all of the light received by input $E_1$ passes into output $S_2$ with losses by diffusion in the splitter nearly on the order of 1 dB, these losses being weak, for example. This behavior does not depend upon wavelength.

Thus, following an essential characteristic of the splitter in accordance with the invention, we make use of the surprising behavior of the splitter for small values of the half-angle $\alpha$ for determining the ratio of division of the transmitted power, between the two outputs of the splitter at any value whatsoever chosen between 0 and 100%, by an appropriate choice of half-angle $\alpha$ carried out with the aid of the graph of FIG. 5. It is believed that the explanation for the achromatic behavior of the junction is the fact that the interactive region is still single mode, and of small length, resulting in a similar behavior in the two wavelength ranges of interest.

Such a freedom in the choice of the splitting ratio 1 is very advantageous because it permits the production of a great variety of couplers of the type $2 \times N$. Thus, for example, one will be able to produce a coupler of $2 \times 3$ with a splitter in accordance with the invention by presenting an angle $\alpha$ equal to 0.93% which permits the transmission of a third of the light power in one output of the coupler and two thirds in the other. Attached to the latter, one Y-junction divides the power in half, thus the three outputs of the ensemble each receiving one third of the light power which has been transmitted. We will give below in conjunction with FIGS. 7 to 11, other examples of application of the splitter according to the invention to couplers of the type $2 \times N$ or, more generally, of $M \times N$.

One remarks incidentally that, depending on the input of the splitter which is chosen for the injection of the light power, the ratios of power at the outputs of the splitter can be inverted, an inversion which is obviously without any effect if the ratio of power chosen corresponds to a division by half. By launching light simultaneously into the two inputs of the splitter, the powers which are added at the outputs are thus divided in accordance with two ratios which are inverse to one another.

In FIG. 5 we have represented the measured points for the wavelengths of utilized light of 1310 and 1550 nm, respectively. These points are practically merged which illustrates the very good achromaticity predicted for the splitter in accordance with the invention, in the 1280–1600 nm band, which corresponds with the wavelengths used in fiber optic telecommunications. In the same way measurements have shown the remarkable insensitivity of the division ratio of the splitter in accordance with the invention to the polarization of the utilized light, an insensitivity which one can attribute to the amorphous nature of the glass substrate utilized.

Concerning the graph of FIG. 5, it is necessary to note that the variations of the ion exchange manufacturing process for the splitter according to the invention can lead to division characteristics which are slightly shifted with respect to those represented in this FIG. 5, depending on the particular index profile distribution as described above. It is clear that the invention extends to splitters manufactured according to these variations and that the form and limits of the characteristic represented in FIG. 5 are given only as a specific example and should be interpreted broadly. Further it is necessary to note that for the splitter described above, chromatic behavior reappears below $\alpha = 0.7°$, even though the splitting ratio is still a function of the angle, whereas beyond 4° we no longer observe any substantial division of the light beam, all of the light entering via one input of the splitter exiting via the output which is in alignment therewith. This can be interpreted as follows: for a small enough angle, the central region is large enough to allow the modes at different wavelengths (e.g., 1.3 $\mu$m and 1.5 $\mu$m) to have a noticeably different behavior. In considering the proper angle to be used, this means that for a given desired coupling ratio, different angles are possible, but only the largest, above 0.7° in this example, will provide the best achromaticity.

The graph of FIG. 6 corresponds to a splitter in accordance with the invention in which the angle $\alpha$ was chosen to assure a division of the light power in the ratio 0.45/0.55. The variations of the light powers at the two outputs of the coupler are represented, the latter being measured by their attenuation in decibels with respect to the input power. We find an attenuation of approximately 3 dB to be expected, to which is added a supplementary attenuation of 1.5 dB due to the losses by diffusion in the substrate. It is observed that the power ratio remains substantially constant in the envisaged wavelength domain (from 1200 to 1600 nm) which confirms well the achromatic character of the splitter in accordance with the invention.

The geometry of the intersection of the waveguides of the splitter can be adjusted toward certain objectives. Thus we have represented in FIG. 3 a junction in which the intersection is partially bounded by two outer regions which are substantially flat 9, 10, levelling the regions of angle $2\alpha$ at the intersection. Such an arrangement facilitates the realization of the masks which are necessary for the integration of the waveguides by ion diffusion. The width of these outer regions, transverse to the axis of the splitter, is preferably of the order of 1 $\mu$m.

An improved version of the above X-junction can be realized as follows: As mentioned earlier, using angles as wide as described above will result in diffusion losses. To some extent, this effect may be diminished by levelling the intersection in region 11 and 12 of angle $(\pi - 2\alpha)$ as represented (in broken lines) in FIG. 3. The length L of the levelled regions can advantageously be included between 0 and $W/tg(\alpha)$ where W represents the aperture of the mask used for a straight guide of width W. The final width of the central region will therefore be between W and 2W.

The levelling permits the reduction of the diffusion losses of such a junction. Experimental efforts have permitted the attainment of this configuration and a reduction of losses of about 0.3 dB.

However, such levelling diminishes the achromaticity of the device. To compensate, the central region of width L may be lengthened or shortened in such a way that the desired coupling ratio remains substantially constant at all wavelengths of interest.

In FIG. 4, the waveguides at the output of the intersection represented are shifted transverse with respect to the waveguides of the input, as evidenced by the broken line extensions of these input guides. The shifting can be measured parallel to the axis of the intersection by length 1. It permits the reduction of the axial length of the intersection. For each half-angle $\alpha$ there exists a relationship between the length 1 and the desired power ratio.

Finally, the proposed technique for reducing chromaticity described above can be used for X-splitters with angles smaller than the proposed achromatic range. The length L in FIG. 3 or 1 in FIG. 4 is fine tuned to obtain the proper coupling ratio for the desired wavelengths. For example, for typical single mode waveguides operated in the standard telecommunications windows, an angle on the order of 0.5° can be used if the length of the central region of the device (L,1) is reduced to about 250 μm and will result in a quasi-achromatic device.

The splitter according to the invention permits the formation of 2×N couplers particularly performant and carried out in integrated optics. It is known that such couplers are essential for the distribution of several data sources over a large number of optical fibers which are intended for the transmission of information to those places where it will be utilized. The sources can be for example television channels distributed by optical fiber cables. The light power distributed should be substantially equal. Other applications include network path redundancy and testing taps.

Thus one can form a 2×4 coupler with the aid of an X-splitter 13 according to the invention and with two Y-junctions 14, 15 as represented in FIG. 7. One must then form splitter 13 into a half-splitter and for that choose for the splitter a half-angle α=approximately 1° in conformance with the graph of FIG. 5, if the splitter is formed like the one for which this graph was established. The equal light powers thus transmitted on the output guides of splitter 13 are each re-divided by half by the Y-junctions 14 and 15 respectively, which permits the recovery on each of the outputs of the coupler of approximately a quarter of the transmitted power minus the losses. The graph of FIG. 8 representing the attenuations of the light powers at the 4 outputs of the coupler with respect to the power injected into the coupler at one of the two input guides of splitter 13, shows a remarkable equality of the light powers distributed among the four outputs across the entire lengths 1200 to 1640 nm wavelength region, a significant equality of achromaticity for such a coupler.

Couplers with a greater number of outputs can be produced advantageously by combining the splitter in accordance with the invention with the optic coupler described in U.S. patent application Ser. No. 876,954 filed Apr. 30, 1992 and assigned to the Assignee of the present application. Represented in FIGS. 9 and 10 of the attached drawings are 2×8 and 2×16 couplers respectively, obtained by such combinations, each comprising a half-power splitter 13', 13'', respectively, according to the invention, and a coupler 16' 16'' of the type described in the above-cited patent application, respectively. As we have seen earlier, the half-angle α for splitters 13', 13'' is on the order of 1°. In conformance with the teachings of the patent application cited above, couplers 16', 16'' each comprise a plurality of waveguides which are substantially co-planar, each connecting a single input of the coupler to one of the 2n outputs ($S_1$ to $S_8$ or $S_{16}$) of this coupler, these waveguides being composed of waveguide sections connected in a tree and branch manner by n Y-junctions $J_{ij}$, placed along each guide. At least a first junction ($J_{21}$ for example) with an axis which is not parallel to that of the coupler, is connected to two other junctions $J_{31}$, $J_{32}$, by curved waveguide sections which are free of any singularities, any eventual inflection point on any one of the waveguides between the input and the nth junction stage being located at one of the n junctions located on the guide. In accordance with a preferred production method for such a coupler, each junction of the coupler, beyond the input, defines an inflection point on one of the waveguides passing through this junction. Each junction comprises first and second branches of opposing curves tangent to a third branch at a point common to the three branches.

Such couplers 13', 16' or 13'', 16'' can be produced in integrated optics and offer various advantageous characteristics, notably a reduced longitudinal dimension and lower optical losses as indicated in the patent application cited above to which one may refer for further details.

More generally, one can produce couplers with M inputs (M>2) and N outputs by using several successive stages of splitters according to the invention, operating at power ratios which are eventually different. We have represented in FIG. 11 a 3×3 coupler as a non-limiting illustrative example. The coupler comprises three inputs $E_1$, $E_2$, $E_3$, three outputs $S_1$, $S_2$, $S_3$, and three splitters $D_1$, $D_2$, $D_3$, in accordance with the invention, staged in that order. The inputs of a first splitter $D_1$ constitute inputs $E_1$, $E_2$. The inputs of a second splitter $D_2$, are connected respectively to an output of splitter $D_1$ and to the input $E_3$, an output of splitter $D_2$ forming an output $S_3$ of the coupler. The other output $D_2$ is connected to an input of splitter $D_3$, the other input of this splitter being connected to the output of splitter $D_1$ which is not connected to $D_2$. The outputs of splitter $D_3$ form the outputs $S_1$, $S_2$ of the 3×3 coupler.

In choosing for the splitters $D_1$ and $D_3$, the half-angles α around 1°, one obtains a half-division of the entering (light power according to the hypothesis in which the substrate is glass and in which the guides result from doping the glass with Tl+ ions, by ion exchange). One chooses for $D_2$ a half-angle α of 1.13°, which assures a division of the light power in the ratio 0.33/0.66 (see FIG. 5). With splitters $D_1$, $D_2$, $D_3$ thus chosen and arranged, and with a proper path length allowing the modes to recombine in phase through splitter $D_3$, it is ascertained that the light power received by any one of the inputs $E_1$, $E_2$, $E_3$ is equally distributed among the three outputs $S_1$, $S_2$, $S_3$.

Of course, the invention is not limited to this embodiment. By application of the teachings contained in the present patent application, one skilled in the art will easily be able to design other couplers 4×4, 8×8 and, more generally of M inputs by N outputs with all sorts of power division ratios among the outputs.

As we have seen above, the splitter and the couplers in accordance with the invention can be made by the diffusion of Tl+ ions in a glass substrate, which makes this manufacturing particularly economical. However, the invention is not limited to the use of such materials, and other substrates can be envisaged, doped silica, for example. According to this hypothesis the rule linking the angle of the waveguides of the splitter and the ratio of the output light powers for small values of this angle could deviate from that represented in FIG. 5, as well as the limits of the utilization domain. The expression of these limits in the claims of the present patent application is therefore given only to provide an idea and should consequently be interpreted broadly. Nonetheless, for waveguides whose fundamental modes are dimensionally close to those evoked above, the indicated values should remain approximately valid.

It is important to note that the angle should be as large as possible compatible with the desired coupling ratio, to attain better achromaticity. This has a penalty in terms of diffusion losses. Lower loss may be achieved provided that greater chromaticity is acceptable (if for example the shorter wavelength range is of interest) and such lower loss may be achieved by using smaller angles.

When it is produced in glass substrate or comparable material, the splitter in accordance with the invention presents various advantages. It is not, first of all, sensitive to the polarization of the utilized light. It comprises guides which have the same width and can therefore be produced with corresponding masks permitting the avoidance of manufacturing difficulties when lithographic stages are used in realizing the guides. The absence of guides of different width or diameter also diminishes the optical losses. Further, as illustrated by the graphs of FIGS. 6 and 8, the splitter in accordance with the invention presents a very good achromaticity, notably from 1260 to 1600 nm, the variation of power transmitted remaining less than ±0.2 dB for power ratios of about 50% which is particularly advantageous in the field of optical fiber telecommunications because that permits the utilization of light sources of different wavelengths. An essential advantageous characteristic of the invention is the possibility of fixing the ratio of transmitted light power at any chosen value in order to tap off a predetermined fraction of the light power at input. Further, associated with the couplers of the U.S. patent application cited above, the splitter following the invention permits, for example, the production of couplers which are well adapted to the distribution of several television channels to a great number of receiving sets connected in an optical fiber distribution network.

I claim:

1. An achromatic integrated optics splitter with two inputs, for the transmission of an optical signal entering one input to two outputs, with a predetermined ratio of the signal powers at these two outputs, comprising a symmetrical X-junction of two identical rectilinear waveguides, single mode at the utilization wavelength, and defining at their intersection a half-angle ($\alpha$), characterized in that two flat outer regions (9,10), perpendicular to the axis of the splitter, partially define the boundary of the intersection of the waveguides, these flat outer regions (9,10), cutting off the regions of the two vertices of half-angle ($\alpha$) of the intersection, the half-angle ($\alpha$) being greater than an angular value which is a function of the dimensions of the fundamental mode transmitted by the waveguides, the half-angle being selected to establish the predetermined power ratio.

2. A splitter according to claim 1, characterized in that the width of the said outer regions (9,10), is approximately 1 $\mu$m, projected in the plane of the splitter.

3. A splitter according to claim 1, characterized in that the cut-off wavelength of the waveguides is approximately 1.2 $\mu$m, that the half-angle $\alpha$ of these waveguides is more than 0.72, and that the fundamental modes transmitted by the waveguides are compatible with those of optical fibers to which the splitter can be connected.

4. A splitter according to claim 1, characterized in that each of the input branches of the two waveguides is shifted transversely with respect to the output branch which is parallel to it, the shifting being a function of the predetermined power ratio.

5. A splitter according to any one of claims 1 to 4, characterized in that the regions of the angles at their vertices ($\pi$-2$\alpha$) of the intersection of the waveguides are truncated by the flat outer regions (11,12) parallel to the axis of the splitter and perpendicular to the plane of the waveguides.

6. A splitter according to claim 5 characterized in that the truncated region length is adapted to provide the predetermined power ratio at all wavelengths of interest.

7. A splitter according to claim 5 characterized in that the half-angle ($\alpha$) of the waveguides of the splitter is approximately 1° and that the power ratio is hence about 0.5.

8. A 2×N integrated optics coupler characterized in that it comprises a splitter (13, 13', 13") in accordance with claim 1, and additional splitting means 14, 15, 16', 16") connected to at least one of the splitter outputs.

9. A coupler according to claim 8, characterized in that it comprises a plurality of waveguides which are substantially coplanar, each connecting an input ($J_{21}$, $J_{22}$) of this plurality to one of the outputs ($S_1$ to $S_8$, $S_1$ to $S_{16}$) of the plurality, the inputs ($J_{21}$, $J_{22}$), each being connected respectively to an output of the splitter (13', 13"), said plurality of waveguides being formed of waveguide sections connected in a tree and branch fashion by Y-junctions ($J_{ij}$) disposed along each guide, at least one junction, with axis not parallel to that of the plurality of waveguides, being connected to two other junctions by curved waveguide sections which are free of singularities, any eventual inflection point of any one of the waveguides up to the last stage of the junctions being situated at one of the junctions disposed along the guide.

10. An integrated optics M×N coupler, M being greater than two, characterized in that said coupler comprises at least two successive stages of splitters according to claim 1, the outputs of the splitters of the last stage being eventually connected to additional means of splitting.

11. A coupler according to claim 10 with three inputs $E_1$, $E_2$, $E_3$ and three outputs $S_1$, $S_2$, $S_3$, characterized in that it comprises three splitters $D_1$, $D_2$, $D_3$ staged in this order, the inputs $E_1$, $E_2$, $E_3$ being connected to the two inputs of the splitter $D_1$ and to an input of splitter $D_2$ respectively, the outputs $S_1$, $S_2$, $S_3$ being connected to two outputs of splitter $D_3$ and to an output of splitter $D_2$, respectively, the output of splitter $D_2$ being connected to one input of splitter $D_3$, the other input of splitter $D_2$ being connected to an output of splitter $D_1$, the other output of splitter $D_1$ being connected to the other input of splitter $D_3$.

* * * * *